United States Patent
Faughnan et al.

[11] 4,009,935
[45] Mar. 1, 1977

[54] ELECTROCHROMIC DEVICE HAVING A DOPANT THEREIN TO IMPROVE ITS COLOR CENTER ABSORPTION CHARACTERISTICS

[75] Inventors: Brian Wilfred Faughnan; Richard Seely Crandall, both of Princeton, N.J.

[73] Assignee: RCA Corporation, New York, N.Y.

[22] Filed: July 11, 1975

[21] Appl. No.: 595,286

[52] U.S. Cl. .......................................... 350/160 R
[51] Int. Cl.² .......................................... G02B 5/23
[58] Field of Search .................. 350/160, 311, 312; 340/336

[56] References Cited

UNITED STATES PATENTS

| | | | |
|---|---|---|---|
| 3,451,741 | 6/1969 | Manos | 350/160 R |
| 3,521,941 | 7/1970 | Deb et al. | 350/160 R |
| 3,560,078 | 2/1971 | McIntyre et al. | 350/160 R |

Primary Examiner—David C. Nelms
Attorney, Agent, or Firm—Glenn H. Bruestle; Carl L. Silverman

[57] ABSTRACT

An electrochromic device includes a layer of electrochromic material, such as tungsten oxide. The electrochromic material includes a dopant, such as molybdenum oxide. A sufficient amount of the dopant, for example, 2% by atomic weight, functions to shift the natural color center absorption peak of the electrochromic layer. Due to the shift of the color center absorption peak, coloration of the layer of electrochromic material exhibits an improved match to the spectral sensitivity of the human eye. Consequently, less electrical energy is required to operate the device at satisfactory viewing levels as compared to conventional devices where the color center absorption peak is less closely matched to the spectral sensitivity of the human eye.

17 Claims, 3 Drawing Figures

ELECTROCHROMIC DEVICE HAVING A DOPANT THEREIN TO IMPROVE ITS COLOR CENTER ABSORPTION CHARACTERISTICS

BACKGROUND OF THE INVENTION

This invention relates to electrochromic devices, and particularly to an electrochromic device in which the color center absorption of the electrochromic layer is relatively well matched to the spectral sensitivity of the human eye.

Electrochromic devices are well-known devices which exhibit a phenomenon known as "persistent electrochromism", e.g., see U.S. Pat. No. 3,521,941 entitled, "Electro-Optical Device Having Variable Optical Density," issued July 28, 1970. The term "persistent electrochromism" denotes the property of a material whereby its electromagnetic radiation absorption characteristic is altered, in most instances, even at ambient temperature, under the influence of an electric field. Such materials, for example, may exhibit little or no absorption of visible wavelength in the absence of an electric field, and therefore be transparent, but when subjected to an electric field, effectively absorb in the red end of the spectrum, turning blue in color. Similar effects can be observed in other portions of the electromagnetic spectrum, invisible as well as visible.

Although electrochromic devices have been developed and are successful for many applications, the use of electrochromic materials has been discouraged since many electrochromic materials exhibit color center absorption characteristics which are not well matched to the spectral sensitivity of the human eye. By color center absorption it is meant the optical absorption which arises from impurities or defects added to an otherwise ideal material. This optical absorption can be characterized by an absorption peak and a half-width.

For example, the use of tungsten oxide in electrochromic devices is well known. However, the natural color center absorption of tungsten oxide is relatively broad and peaks at a value which is relatively distant from an ideal peak. The same statement applies also to molybdenum oxide, another well known electrochromic material. If the natural color center absorption peaks of these electrochromic materials were more closely matched to the spectral sensitivity of the human eye, less electrical energy would be required to operate the device at satisfactory viewing levels. In addition to more efficient display operation, the device lifetime would be improved since the device would be operated at lower color center levels. Therefore, it would be desirable to develop an electrochromic display device having an electrochromic layer therein which exhibits color center absorption characteristics which are relatively well matched to the spectral sensitivity of the human eye.

SUMMARY OF THE INVENTION

An electrochromic device includes a substrate and a first electrode on the substrate. A layer of electrochromic material is on the first electrode and an electrolyte is on the layer of electrochromic material. A second electrode is on the electrolyte. The layer of electrochromic material includes an effective amount of a dopant such that the natural color center absorption peak of the layer of electrochromic material is shifted toward the ideal color center absorption peak when the layer of electrochromic material is in a colored state.

DETAILED DESCRIPTION OF THE INVENTION

Figure 1:
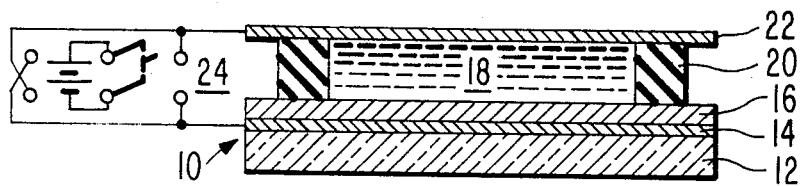
FIG. 1 is a cross-sectional view of one form of electrochromic display device of the present invention.

Referring initially to FIG. 1, an electrochromic display device of the present invention is generally designated as 10. The device includes a transparent substrate 12, e.g., glass, and a first transparent electrode 14, e.g., tin doped indium oxide, on the substrate 12. A layer 16 of electrochromic material is on the first electrode 14. In accordance with the present invention, the layer 16 of electrochromic material comprises a mixture of an electrochromic material and a dopant. An effective amount of the dopant is employed such that the layer 16 of electrochromic material exhibits desirable color center absorption characteristics. For example, a preferred layer 16 of electrochromic material may comprise about 98% tungsten oxide by atomic weight and about 2% molybdenum oxide by atomic weight.

An electrolyte 18, such as phosphoric acid or sulfuric acid, is in contact with a surface of the layer 16 of electrochromic material. The acid electrolyte 18 can be in the range of from about 0.5 Molarity (M) to about 5M, with about 2M being typical. The electrolyte 18 is partially contained by a spacer 20. It is preferable that the spacer 20 be of a material, which is inert with respect to the electrochromic environment of the device 10, e.g., a plastic. A second electrode 22 is in contact with the electrolyte 18 such that the electrolyte 18 is completely contained by the layer 16 of electrochromic material, the spacer 20, and the second electrode 22. The second electrode 22 may comprise graphite on stainless steel or graphite in admixture with an electrochromic material, as disclosed in U.S. Pat. No. 3,827,784 entitled, "Simple, Bonded Graphite Counter Electrode for Electrochromic Devices", issued Aug. 6, 1974. A conventional electrical biasing network 24 is provided. The network 24 enables one to reverse the biasing as desired wherein one biasing will produce coloration of the layer 16 of electrochromic material while the opposite polarity will cause bleaching, as is known in the art.

The electrochromic device of FIG. 1 can be constructed through methods well known in the art, e.g., as described in previously mentioned U.S. Pat. No. 3,827,784. The electrochromic layer 16 can be deposited through known techniques. For example, since tungsten oxide and molybdenum are materials which have similar physical properties, co-evaporation is convenient. However, other techniques can also be employed, e.g., co-sputtering.

Figure 2:
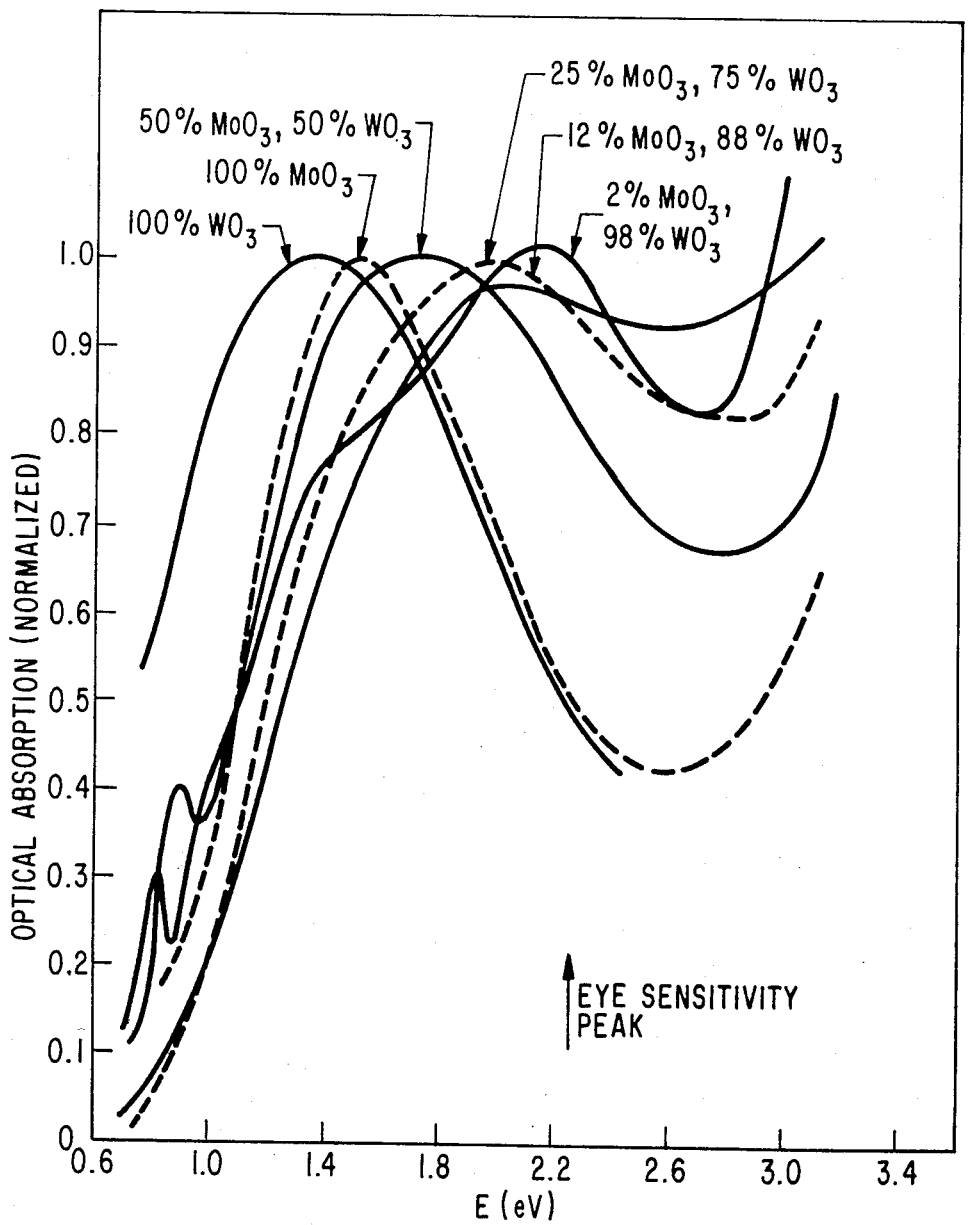
FIG. 2 is a graph showing the normalized optical absorption as a function of the energy of the incident light for electrochromic layers having various compositions.

The optical properties of the various electrochromic layers used in display devices 10 of the present invention in relation to the optical properties of conventional electrochromic layers are shown in FIG. 2. The normalized optical absorption of each of the layers of electrochromic material was obtained through the technique of transmission spectroscopy using a Carey 14 Spectrophotometer, as is known in the art. As previously mentioned, conventionally employed electrochromic materials exhibit natural color center absorption peaks which are relatively far from the ideal color absorption peak of about 2.3eV (0.55μm) which corresponds to the spectral sensitivity of the human eye. For example, an electrochromic layer of 100% tungsten oxide, a widely used electrochromic material, exhibits a color center absorption peak at about 1.4 eV (0.9μm), as shown in FIG. 2. Similarly, an electrochromic layer of 100% molybdenum oxide, another widely used electrochromic material, exhibits a color center absorption peak at about 1.6eV (0.8μm).

As can be observed from FIG. 2, each of the layers 16 of electrochromic material in the device of the present invention exhibit color center absorption peaks which have shifted toward the ideal peak. For example, the color center absorption of one layer 16 of electrochromic material of the present invention, i.e., tungsten oxide (98% by atomic weight) including molybdenum oxide as a dopant (2% by atomic weight), peaks at 2.1 eV (0.60μm), a value which is relatively close to the ideal peak at about 2.3 eV (0.55μm). Thus, as is apparent, considerably less charge injection, i.e., electrical energy, is necessary for coloration of the electrochromic layer 16 in the device 10 of the present invention as compared to the coloration of conventional electrochromic materials. That is, by more closely matching the color center absorption characteristics of the electrochromic material to the spectral sensitivity of the human eye, less coloration, i.e., less electrical energy, is necessary to operate the device at satisfactory viewing levels.

Referring again to FIG. 2, it can be observed that the shift of the color center absorption peak, due to the presence of the dopant, is unexpected. That is, 100% tungsten oxide, exhibiting an absorption peak at about 1.4 eV, and 100% molybdenum oxide, exhibiting an absorption peak at about 1.6 eV, have together formed a material which exhibits an absorption peak at about 2.1 eV (98% tungsten oxide, 2% molybdenum oxide). Similarly, this unexpected shift is also evident in other mixed compositions, e.g., 50% $WO_3$/50%$MoO_3$; 75% $WO_3$/25%$MoO_3$; and 88%$WO_3$/12%$MoO_3$. It is believed that this unexpected result is due to the relatively unknown mechanism by which coloration in electrochromic material occurs. We now believe that coloration in electrochromic materials arises from an intervalency charge transfer process, see B. Faughnan, R. Crandall, and P. Heyman, *RCA Review*, 36, 177, (1975). This process can occur in a compound containing an element in two different oxidations states, e.g., $W^{5+}$ and $W^{6+}$. In such a case, color absorption occurs due to electron transfers, i.e., transitions, between ions of different oxidation states. In the uncolored tungsten oxide ($WO_3$) layer, all the tungsten ions are in the $W^{6+}$ state. In the coloration process, injected electrons reduce some of the $W^{6+}$ ions to $W^{5+}$, thereby allowing the $W^{5+} \rightarrow W^{6+}$ charge transfer absorption to take place, whereby coloration occurs.

Our experiments with tungsten oxide-molybdenum oxide materials, i.e., mixed oxide layers, have led us to believe that the $Mo^{5+}$ ions have lower energy than the $W^{5+}$ ions. Therefore, when electrons are injected into the electrochromic material, $Mo^{6+}$ ions are reduced rather than $W^{6+}$ ions. Consequently, we believe that, in such a case, the resultant unexpected color absorption shift is primarily due to a combination of the transitions $Mo^{5+} \rightarrow Mo^{6+}$, peaked at 1.6eV (0.8μm), and $Mo^{5+} \rightarrow W^{6+}$, peaked at 2.3eV (0.55μm). This can be observed from FIG. 3 where the optical absorption of a layer of electrochromic material having 98% tungsten oxide and 2% molybdenum oxide by atomic weight is shown as a function of the energy of the incident light. The curve for $Mo^{5+}$ to $W^{6+}$ was obtained by comparing the optical absorption curves for $W^{5+}$ to $W^{6+}$ and $Mo^{5+}$ to $Mo^{6+}$ with the resultant observed optical absorption curve. Thus, it is the mixed-ion transition, i.e., $Mo^{5+}$ to $W^{6+}$, which appears to be responsible for the unexpected shift in the color absorption of the resultant electrochromic layers.

Therefore, beginning with an electrochromic layer of 100% tungsten oxide, the desired mixed-ion transition, $Mo^{5+}$ to $W^{6+}$, can be maximized, at the expense of the like-ion transition, i.e., $W^{5+}$ to $W^{6+}$, $Mo^{5+}$ to $Mo^{6+}$, by increasing the proportion of molybdenum oxide present in the layer. However, if too much molybdenum oxide is present, e.g., over 50% by atomic weight, the probability of having mixed-ion transitions becomes less than the probability of having like-ion transitions. We have found electrochromic layer compositions having less than about 10% by atomic weight of the dopant to be preferable since in this range there are at least about nine $W^{6+}$ ions for each $Mo^{5+}$ ion, i.e., the desirable transition from $Mo^{5+}$ to $W^{6+}$ is favored over the less desirable transition from $Mo^{5+}$ to $Mo^{6+}$. In order to maintain this relation in which the mixed-ion transition is favored, it has been found that it is essential to reduce the number of injected electrons which induce the coloration, i.e., decrease the electrical energy utilized, such that substantially all the ions reduced are molybdenum ions, i.e., $Mo^{6+}$ to $Mo^{5+}$. That is, since it appears that molybdenum ions have lower energies than tungsten ions, only a sufficient number of electrons need be injected into the layer of electrochromic material such that the reduced ions are substantially all molybdenum ($Mo^{5+}$). Otherwise, if a surplus of electrons are injected, tungsten ions will also be reduced to $W^{5+}$ whereby the probability of the mixed-ion transition will be decreased along with an increased probability of undesirable like-ion transitions, i.e., $W^{5+}$ to $W^{6+}$.

Figure 3:
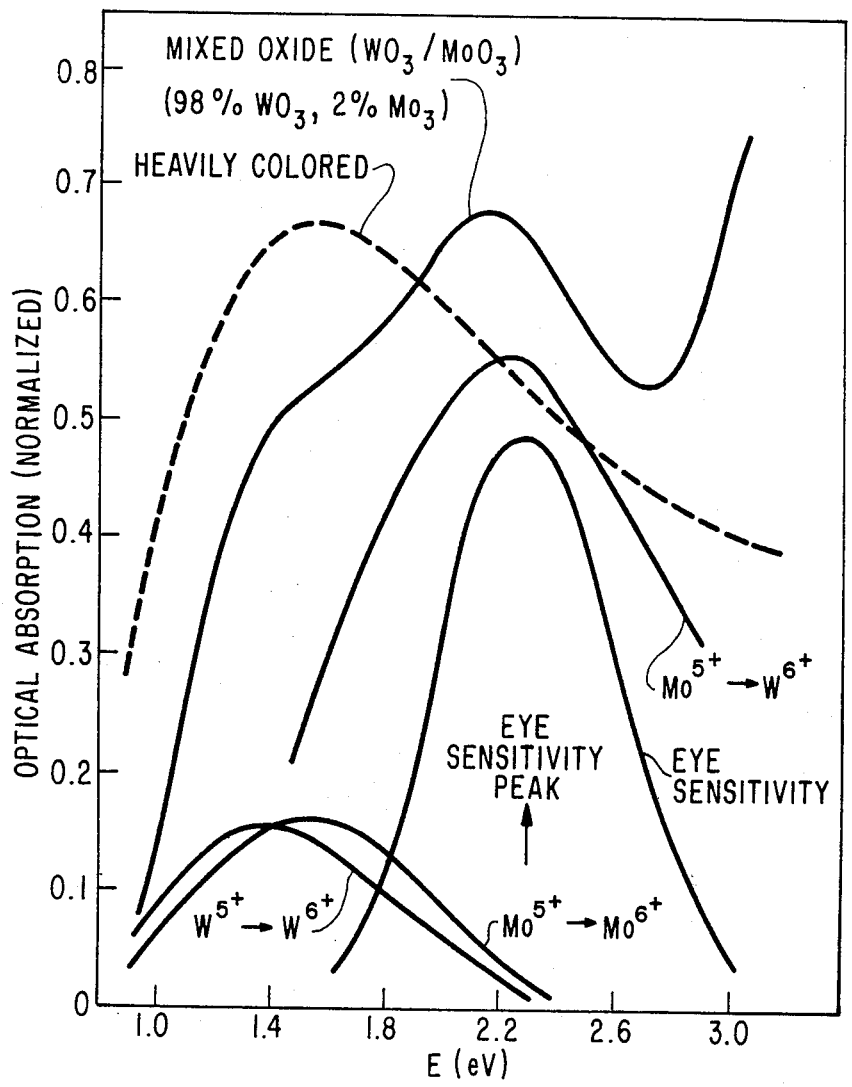
FIG. 3 is a graph showing the normalized optical absorption as a function of the energy of the incident light for an electrochromic layer having a particular composition.

Consequently, if a surplus of electrons are injected into the layer of electrochromic material of the present invention, i.e., the layer is heavily colored, so as to reduce some of the tungsten ions, the layer of electrochromic material exhibits an optical peak which is less desirable than a less heavily colored layer, as shown in FIG. 3. Thus, as previously mentioned, it is desirable to inject only a sufficient number of electrons such that the reduced ions are substantially all $Mo^{5+}$. This is quite simple to accomplish, either under typical constant voltage or constant current operation conditions, by controlling the pulse length.

Although the electrochromic display device has been described with a tungsten oxide/molybdenum oxide combination, other combinations are possible. That is, desirable mixed-ion transitions can be achieved merely through the appropriate choice of proportions of various electrochromic materials. Furthermore, although much of the phenomenon of electrochromism is not presently understood, the electrochromic devices of the present invention function as described, whether or not the present theories explaining the phenomenon prove to be correct.

In addition to permitting more efficient operation of electrochromic devices, the electrochromic display device of the present invention offers the possibility of choosing the display color merely through changes in proportions and/or ingredients. Since it appears to be typical that the mixed-ion transitions result in the absorption of higher energy incident light as compared to the like-ion transitions, similar results can be obtained with other combinations. Also, although the display device of the present invention has heretofore been described as including one electrochromic material and one dopant, other combinations are possible, i.e., the use of three or more different materials in the electrochromic layer. Thus, there is provided by the present invention, an electrochromic display device having an electrochromic layer therein which exhibits color center absorption characteristics which are relatively well matched to the spectral sensitivity of the human eye.

We claim:

1. In an electrochromic display device of the type having a substrate, a first electrode on the substrate, a layer of electrochromic material on the first electrode, an electrolyte on the layer of electrochromic material, and a second electrode on the electrolyte, wherein the improvement comprises:

said layer of electrochromic material including less than about 50% of a dopant by atomic weight such that the natural color center absorption peak of said layer of electrochromic material in a pure colored state is shifted upward in energy toward the ideal color center absorption peak of about 2.3 eV when said doped layer of electrochromic material is in a colored state.

2. An electrochromic device in accordance with claim 1 in which said electrolyte comprises an acid.

3. An electrochromic display device in accordance with claim 2 in which said acid comprises phosphoric acid.

4. An electrochromic device in accordance with claim 1 wherein said layer of electrochromic material comprises tungsten oxide.

5. An electrochromic device in accordance with claim 4 wherein said dopant comprises molybdenum oxide.

6. An electrochromic display device in accordance with claim 5 in which said electrochromic layer comprises less than about 10% of said dopant by atomic weight.

7. An electrochromic display device in accordance with claim 6 in which said electrochromic layer comprises between about 2 to about 7% of said dopant by atomic weight.

8. An electrochromic device in accordance with claim 1 wherein said layer of electrochromic material includes an effective amount of said dopant such that electron transitions from ions of said dopant to ions of said electrochromic material are more probable than electron transitions between ions of said dopant or transitions between ions of said electrochromic material.

9. A method of forming a layer of electrochromic material having a desirable color center absorption peak, comprising:

depositing the electrochromic material and a dopant on a substrate with less than about 50% of said dopant by atomic weight being deposited such that the natural color center absorption peak of said layer of electrochromic material in a pure colored state is shifted upward in energy when said doped layer of electrochromic material is in a colored state.

10. A method in accordance with claim 9 wherein said depositing of said electrochromic material and said dopant includes co-evaporating.

11. A method in accordance with claim 10 wherein said electrochromic material comprises tungsten oxide.

12. A method in accordance with claim 11 wherein said dopant comprises molybdenum oxide.

13. A method in accordance with claim 11 wherein said effective amount of said dopant deposited comprises less than about 10% molybdenum oxide by atomic weight.

14. A method in accordance with claim 9 where said depositing of said electrochromic material and said dopant includes co-sputtering.

15. In an electrochromic display device of the type having a substrate, a first electrode on the substrate, a layer of electrochromic material on the first electrode, an electrolyte on the layer of electrochromic material, and a second electrode on the electrolyte, wherein said electrochromic layer comprises:

tungsten oxide doped with molybdenum oxide.

16. An electrochromic display device in accordance with claim 15 in which said electrochromic layer comprises less than about 10% of molybdenum oxide by atomic weight.

17. An electrochromic display device in accordance with claim 16 in which said electrochromic layer comprises between about 2% to about 7% of molybdenum oxide by atomic weight.

* * * * *